R. W. SCOTT.
POLE ERECTOR AND SETTER.
APPLICATION FILED JUNE 25, 1909.
982,443.
Patented Jan. 24, 1911.
2 SHEETS—SHEET 1.
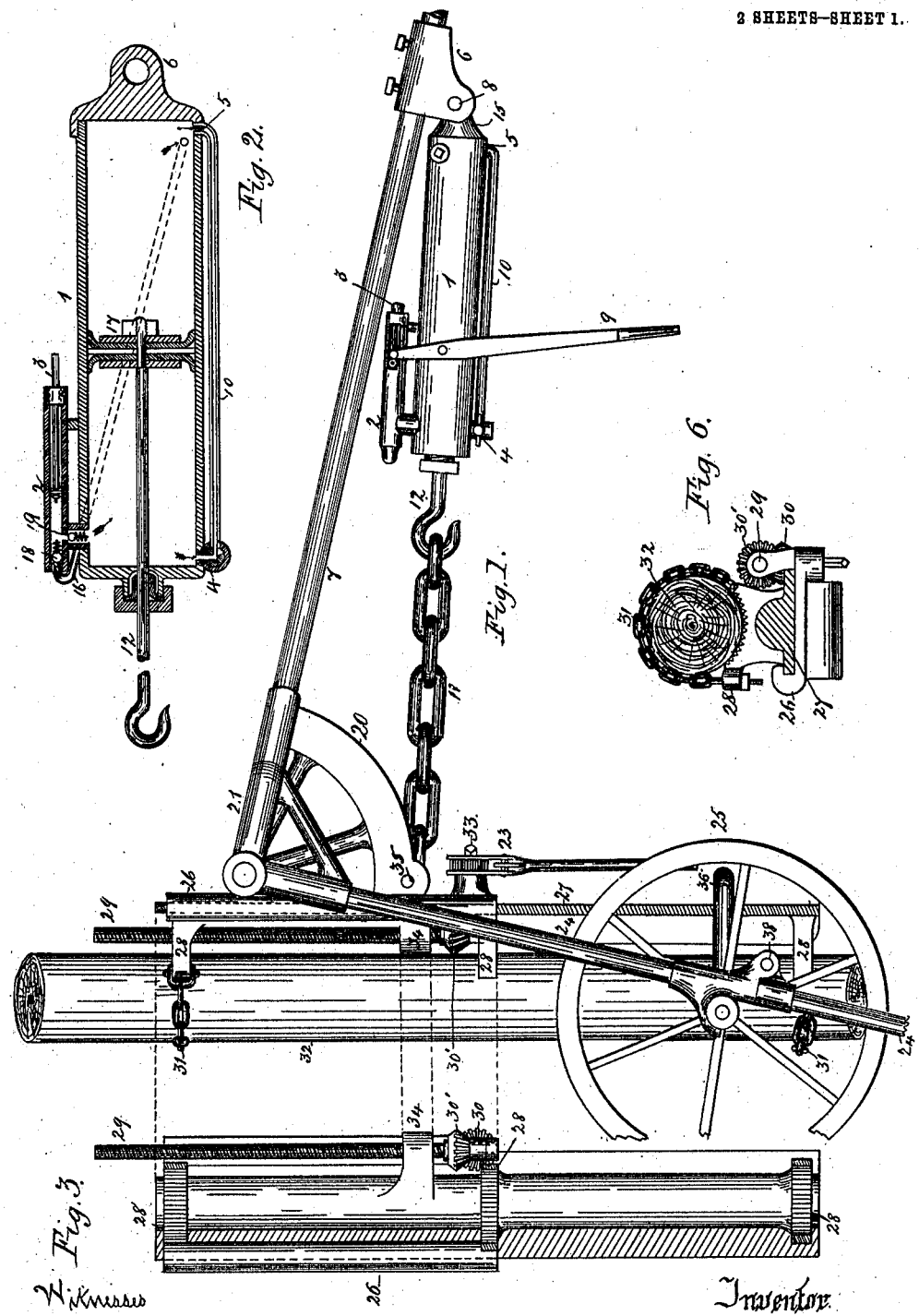

R. W. SCOTT.
POLE ERECTOR AND SETTER.
APPLICATION FILED JUNE 25, 1909.
982,443.
Patented Jan. 24, 1911.
2 SHEETS—SHEET 2.
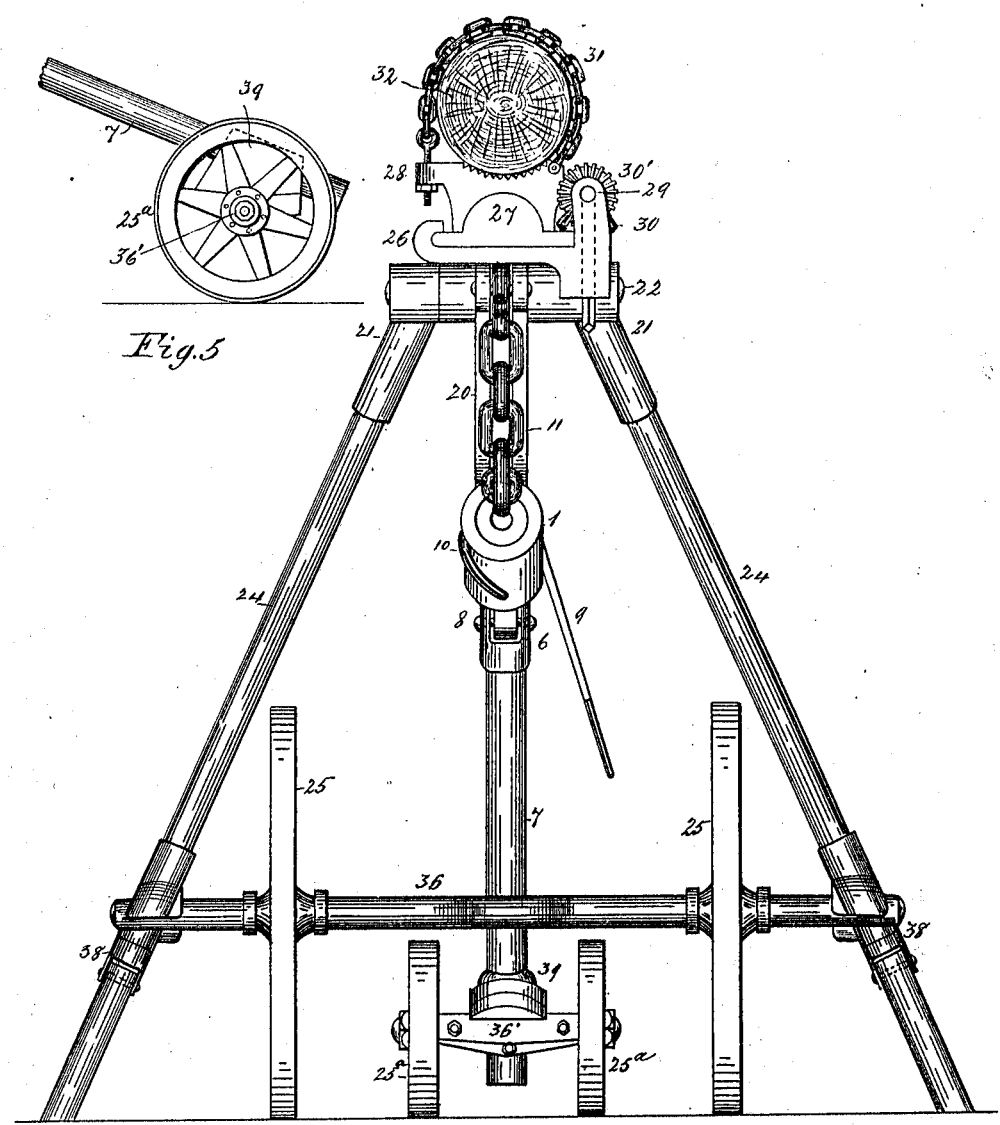

UNITED STATES PATENT OFFICE.

RICHARD WALTER SCOTT, OF HAMILTON, ONTARIO, CANADA, ASSIGNOR OF ONE-HALF TO WILLIAM J. BOLAND, OF DAVISVILLE, CANADA.

POLE ERECTOR AND SETTER.

982,443. Specification of Letters Patent. Patented Jan. 24, 1911.

Application filed June 25, 1909. Serial No. 504,395.

To all whom it may concern:

Be it known that I, RICHARD WALTER SCOTT, a citizen of the Dominion of Canada, and resident of the city of Hamilton, county of Wentworth, Province of Ontario, Canada, have invented a certain new and useful Pole Erector and Setter; and I do hereby declare that the following is a full, clear, and exact description of the construction and operation of the same.

The invention relates to mechanism constructed in such a manner as to erect telephone and telegraph poles, &c., and set them upright in their appropriate holes in a speedy safe and expeditious manner with one third of the help now required to erect heavy poles requiring a large number of men with the ordinary pike poles.

The invention consists of an irregular strong tripod of steel bars, carried on wheels, mechanism to carry the pole, and mechanism to elevate the pole, and power mechanism to operate the same as will be more fully shown hereinafter reference being had to the accompanying drawing in which,—

Similar letters refer to similar parts in the several views.

Figure 1, is a side elevation of the machine embodying my invention. Fig. 2, is a longitudinal section of the oil cylinder to produce power to operate the mechanism. Fig. 3, is a side elevation of the central part shown in Fig. 1, on the opposite side. Fig. 4, is an end elevation. Fig. 5, is a side view of one of the wheels &c. Fig. 6 is a cross section of pole and rest etc.

In the drawing 24, 24 represent a pair of front legs carried by two wheels 25, 25, mounted on a curved axle 36, and 7 is a rear extension leg, the outer end being attached to a swivel 39, pivotally secured to an axle 36′, carried by a pair of smaller wheels 25ᵃ Fig. 4, the said legs 24, 24 and 7, form a tripod carried on wheels 25, and 25ᵃ, and at their apex or top are secured to a steel casting 21, as shown at Figs. 1 and 4, 26 is a guide plate turned up at the sides on which is made to rest and move a slide plate 27, the parts 26, and 21, being held together by a pin 22 as shown in said Figs. 1 and 4, the said parts being strong and suitably braced.

28, 28, 28 are three pole rests attached to the slide 27, to which to secure chains 31 which are made to pass around the pole 32 and hold it while it is being erected and set vertically in its hole.

29 is a screw made to pass through a threaded lug 34 secured to the slide 27 that holds the pole 32, a bevel gear 30′, is attached to the lower end of the said screw, and made to engage with a similar bevel gear 30 on the gear shaft 33, on the outer end of which is a ratchet and pawl device with handle to operate the said parts to lower the pole 32 into its appropriate place of rest.

*Mechanism for raising the pole.*—The means for raising the pole previous to erecting it may be described as follows. 1, Fig. 1 is a cylinder, one end secured to a steel casting 6 attached in any convenient manner to the leg 7, the means shown is by a pin 8, made to pass through both the casting and end 15 of the cylinder as shown at Fig. 1. A piston rod 12, being secured to the piston 17 extends out of the cylinder 1, and terminates in a hook to which is fastened one end of a chain 11, the other end of said chain being secured to a pin 35, in the curved chain rest 20, attached to the casting 21. A pump 2, is secured to the cylinder 1, and is provided with a pump plunger 3, inside of it, a handle 9, to operate the plunger, a suction ball inlet valve 18 on the upper end of the pump, an oil pipe 16 connecting the said valve 18 with the cylinder 1, and an outlet ball valve 19 communicating with the interior of said cylinder. The cylinder 1, to which the pump is attached as shown at Figs. 1 and 2, is provided with an inlet 5, stopped with a filling plug, by which the cylinder is supplied with oil, and it is also provided with a relief valve 4, at one end the same being connected to the inlet 5, by a small pipe or tube 10 for the return of oil to the cylinder 1. 17 is the piston inside of the cylinder, to which the piston rod 12 is attached, said piston rod being attached to the chain 11 which extends to the pin 35 of the chain rest 20 at the head portion of the tripod 24, 7.

It will be observed that the pole, 32, is secured on the long slide, 27, in a horizontal position, then carried by the truck wheels to the excavated hole prepared for it, when the butt is over the hole, the pole is gradually elevated to a vertical position as in Fig. 1, by working the pump handle, 9, of the cylinder, 1, which produces enough power to pull on the chain, 11, until the pole is in a vertical position over the hole, when by means of the screw, 29, and bevel gears operated by the ratchet and handle 23, the pole, 32, is gently lowered into the hole prepared for it, the power for raising the pole being explained hereinafter.

It will be observed that the apparatus is capable of being easily moved about on the four wheels, and to facilitate that I arrange to have the two front legs 24, 24 provided each with a knuckle joint 38, so as the bottom of each leg can be elevated slightly above the ground when moving the apparatus on the wheels 25, from place to place. It may further be observed that in the practical application of applying power to the mechanism to raise the pole to a vertical position after being placed on the long slide plate horizontally it will be assumed the cylinder is full of oil; by raising the plunger of the pump, the oil is drawn from the back of the piston, and on the reverse stroke of the plunger, the oil is forced in front of the piston pushing it back, the movement continued back and forth until the piston reaches the rear end of the cylinder thus bringing the pole from a horizontal to a vertical position, now, by opening the relief valve, the oil flows back to the rear end of the cylinder allowing the piston to be pulled forward ready for operating on another pole to be erected. It will be noted that as the cylinder is always full of oil there is no waste unless there happens to be a leak which can easily be repaired. It may further be explained that the essential feature of the ratchet, 23, (with handle) on the shaft, 33, is for the purpose of causing the bevel gear, 30, to engage with bevel gear, 30', on the screw, 29, and rotate the same, allowing the slide, 27, to which the pole, 32, is attached, to be lowered gradually into the hole prepared for it, when the pole is erected in a vertical position.

Having thus described my device and its advantages, what I claim as my invention and desire to secure by Letters Patent, is—

1. In a pole erector and setter, a tripod comprising adjustable front legs hinged at the top, and united by a curved axle, carrying a pair of large wheels, the rear leg elongated and united to a swivel attached to an axle carrying a pair of rear wheels, and mechanism secured to the tripod to support and erect a pole.

2. In combination with a tripod, of the class specified, a steel casting (21), hinged thereto, a guide plate attached to the said casting, a slide plate made to move in the same, a series of pole rests secured to the said slide plate to carry and move the pole, and mechanism to raise and set it.

3. In a device of the class specified in combination with a tripod, a pump adjustably attached to the rear leg of the tripod, a connection between the piston of the cylinder and the chain rest (20) and means to elevate the pole.

4. In a device of the class specified in combination with the guide plate (26) and slide plate (27), a screw (29), made to pass through a threaded lug (34), secured to said slide plate, a bevel gear (30') affixed on the end of said screw, a bevel gear (30) on the end of a gear shaft (33), to engage with the first mentioned bevel gear, a ratchet and pawl attached to the gear shaft (33) to lower the pole to its place of rest.

Dated at Hamilton, Ont. the 12th day of April 1909.

RICHARD WALTER SCOTT.

Signed in the presence of—
W. BRUCE,
G. NICHOLSON.